(12) United States Patent
Barhorst et al.

(10) Patent No.: US 11,400,549 B2
(45) Date of Patent: Aug. 2, 2022

(54) TUBULAR WIRES MADE FROM COPPER COATED STRIP

(71) Applicant: Hobart Brothers LLC, Troy, OH (US)

(72) Inventors: Steven E. Barhorst, Sidney, OH (US); Mario A. Amata, Dublin, OH (US); Joseph C. Bundy, Piqua, OH (US)

(73) Assignee: HOBART BROTHERS LLC, Troy, OH (US)

( * ) Notice: Subject to any disclaimer, the term of this patent is extended or adjusted under 35 U.S.C. 154(b) by 428 days.

(21) Appl. No.: 16/519,946

(22) Filed: Jul. 23, 2019

(65) Prior Publication Data

US 2019/0344391 A1 Nov. 14, 2019

Related U.S. Application Data

(63) Continuation of application No. 16/369,849, filed on Mar. 29, 2019.
(Continued)

(51) Int. Cl.
*B23K 35/00* (2006.01)
*B23K 35/30* (2006.01)
(Continued)

(52) U.S. Cl.
CPC ...... *B23K 35/3053* (2013.01); *B23K 35/0261* (2013.01); *B23K 35/0266* (2013.01);
(Continued)

(58) Field of Classification Search
CPC .. B23K 35/3053; B23K 35/0261–0283; B23K 35/0266; B23K 35/0272;
(Continued)

(56) References Cited

U.S. PATENT DOCUMENTS

| 1,756,568 A | * | 4/1930 | Pennington | ........ | B23K 35/0261 |
| | | | | | 428/685 |
| 2,001,848 A | * | 5/1935 | Nyquist | ............. | B23K 35/0272 |
| | | | | | 219/145.23 |

(Continued)

FOREIGN PATENT DOCUMENTS

| CN | 101500746 | 8/2009 |
| CN | 102310302 | 1/2012 |

(Continued)

OTHER PUBLICATIONS

PCT, "International Search Report and Written Opinion," issued in connection with Application No. PCT/US2019/024874, dated Jun. 25, 2019, 20 pages.

(Continued)

*Primary Examiner* — Kiley S Stoner
(74) *Attorney, Agent, or Firm* — McAndrews Held & Malloy, Ltd.

(57) ABSTRACT

The present disclosure relates to a method for producing a tubular welding electrode comprising the steps of providing a strip of metal material having a length and first and second surfaces, wherein at least the first surface of the strip is at least substantially coated with nickel or a nickel alloy and then copper or a copper alloy, forming the strip into a "U" shape along the length, filling the "U" shape of the strip with a granular powder flux, and mechanically closing the "U" shape to form a sheath of nickel- and copper-coated metal material that substantially encases the granular powder flux, thus forming a tubular welding electrode. In certain embodiments, the metal material may be steel. In certain other embodiments, the metal material may be nickel or a nickel alloy, which may be at least substantially coated with copper or a copper alloy.

14 Claims, 6 Drawing Sheets

Related U.S. Application Data (60) Provisional application No. 62/650,475, filed on Mar. 30, 2018.

(51) Int. Cl.

| | | |
|---|---|---|
| *B23K 35/40* | (2006.01) | |
| *C25D 5/48* | (2006.01) | |
| *C25D 7/06* | (2006.01) | |
| *B23K 35/02* | (2006.01) | |
| *H01M 50/00* | (2021.01) | |

(52) U.S. Cl.
CPC ........ *B23K 35/0272* (2013.01); *B23K 35/404* (2013.01); *B23K 35/406* (2013.01); *C25D 5/48* (2013.01); *C25D 7/0614* (2013.01); *H01M 50/00* (2021.01); *B23K 2035/408* (2013.01)

(58) Field of Classification Search
CPC ............... B23K 35/404; B23K 35/406; B23K 2035/408; C25D 5/48; C25D 7/0614; H01M 50/00; Y02E 60/10
USPC .............................. 219/145.1–146.52, 137.2
See application file for complete search history.

(56) References Cited

U.S. PATENT DOCUMENTS

| | | | | | |
|---|---|---|---|---|---|
| 3,620,830 | A | * | 11/1971 | Kramer | B23K 35/404 428/641 |
| 3,807,026 | A | * | 4/1974 | Takeo | B21C 37/047 29/419.1 |
| 3,834,002 | A | * | 9/1974 | Sissons | B23K 35/302 419/61 |
| 4,134,528 | A | * | 1/1979 | Bahre | B23K 20/227 228/115 |
| 4,305,197 | A | * | 12/1981 | Puschner | B23K 35/0272 419/24 |
| 4,426,428 | A | * | 1/1984 | Kammer | B23K 35/365 219/145.23 |
| 4,449,031 | A | * | 5/1984 | Kotecki | B23K 35/3601 219/146.1 |
| 5,260,540 | A | * | 11/1993 | Kamimura | B23K 35/0255 219/137 WM |
| 5,903,814 | A | * | 5/1999 | Miura | B23K 35/3608 148/26 |
| 2003/0052113 | A1 | * | 3/2003 | Saito | B23K 35/0266 219/145.22 |
| 2003/0094444 | A1 | * | 5/2003 | Kato | B23K 35/3608 219/146.3 |
| 2004/0079742 | A1 | * | 4/2004 | Kelly | B21C 37/042 219/146.22 |
| 2007/0170152 | A1 | * | 7/2007 | James | C25D 7/0607 219/146.1 |
| 2011/0171485 | A1 | * | 7/2011 | Kawamoto | B23K 35/362 428/576 |
| 2015/0044506 | A1 | * | 2/2015 | Kwak | B23K 35/406 428/682 |
| 2015/0099140 | A1 | * | 4/2015 | Amata | B23K 35/3618 219/146.1 |
| 2015/0298263 | A1 | * | 10/2015 | Goncharov | C22C 38/54 427/59 |
| 2016/0193699 | A1 | * | 7/2016 | Han | B23K 35/3073 219/145.22 |
| 2016/0271736 | A1 | * | 9/2016 | Han | C22C 38/54 |
| 2017/0312861 | A1 | | 11/2017 | Jin | |
| 2018/0272477 | A1 | * | 9/2018 | Sasaki | B23K 35/3607 |
| 2018/0326544 | A1 | * | 11/2018 | Yamakami | C22C 38/48 |
| 2019/0030655 | A1 | * | 1/2019 | Watanabe | B23K 35/368 |
| 2019/0329347 | A1 | * | 10/2019 | Fujimoto | B23K 9/167 |
| 2020/0070273 | A1 | * | 3/2020 | Watanabe | C22C 38/06 |
| 2020/0156191 | A1 | * | 5/2020 | Goncharov | B05D 3/0254 |
| 2021/0394310 | A1 | * | 12/2021 | Barth | C22C 9/02 |
| 2021/0402501 | A1 | * | 12/2021 | Bundy | B23K 35/40 |

FOREIGN PATENT DOCUMENTS

| | | | | |
|---|---|---|---|---|
| CN | 206887203 | | 1/2018 | |
| GB | 2179574 | | 3/1987 | |
| JP | 61003697 | A * | 1/1986 | .......... B23K 35/406 |
| KR | 20110117919 | | 10/2011 | |
| WO | 0038876 | | 7/2000 | |

OTHER PUBLICATIONS

CNIPA, "First Office Action," issued in connection with Application No. 201980021764.X, dated Nov. 22, 2021, 2 pages.

* cited by examiner

TUBULAR WIRES MADE FROM COPPER COATED STRIP

CROSS-REFERENCE TO RELATED APPLICATIONS

This application is a continuation application of U.S. patent application Ser. No. 16/369,849, filed Mar. 29, 2019, which claims benefit of priority from U.S. Provisional Patent Application No. 62/650,475, filed Mar. 30, 2018, both of which are hereby incorporated by reference in their entirety herein.

FIELD

The present disclosure generally relates to welding wire and, more particularly, to tubular wires made from copper coated strip.

BACKGROUND

Existing processes used to manufacture tubular welding electrodes use uncoated steel strips. The uncoated steel strips are filled with a granular flux fill, which becomes the core of the tubular welding electrodes. The uncoated steel strips are then mechanically closed, for example with a butt or overlap seam. This seam is mechanical and not sealed. Because the seam is not sealed, coatings are not applied to the surface of these tubular welding electrodes. If coatings were to be applied, undesired plating chemicals and acids could get inside into the granular flux fill core, which will adversely affect welding performance.

Another process method used to manufacture tubular welding electrodes is sometimes known as the "seamless" process. The seamless process involves using a strip that is formed into a relatively large (approx. ⅝ inch diameter) fully circumferential round tube shape. The adjacent longitudinal edges of the strip are then welded together (e.g., to remove the seam) to form a tube. The flux is added to the tube in an offline vibratory filling process. This process can take upwards of 24 hours to complete. The filled tube is drawn in a series of annealing and drawing reduction steps to a final desired wire diameter. After drawing is completed, the seamless tubular electrode may be copper plated. Here, there is no exposed seam that can trap or allow through to the core undesired acids or other chemicals associated with the plating process. Although such "seamless" wire electrodes allow for the electrodes to have a copper coating (thus improving electrical conductivity and reducing contact tip wear for welding), they are relatively expensive to manufacture—the manufacturing process comprises multiple process steps that are difficult or impossible to conduct as an in-line process and that require large amounts of work in progress (WIP).

Thus, there exists a need for a copper coated tubular wire electrode that can be manufactured by a relatively efficient and less expensive route than the typical seamless process but that does not allow acids or other undesired chemicals to react with the granular flux fill core.

SUMMARY

According to one aspect of the present disclosure, a tubular welding electrode having a length comprises a granular core extending substantially along the length of the electrode and a steel sheath extending substantially along the length of the electrode and substantially encasing the granular core. The granular core may be a granular powder flux fill core or a metal core. As used in the present disclosure, "extending substantially along the length" means extending along at least the majority of the length, including (but not necessarily) the entire length. As used in the present disclosure, "substantially encasing" means at least mostly encasing, including (but not necessarily) fully encasing.

The steel sheath has an inner and an outer surface. The steel sheath has and opposing radial ends that extend substantially along the length of the electrode. At least one of the inner or outer surfaces of the steel sheath is at least substantially coated with copper or a copper alloy. The inner or outer surfaces are at least substantially coated with copper or a copper alloy prior to joining the opposing radial ends of the steel sheath. As used in the present disclosure, an "at least substantially coated" surface is one that is at least 90% coated (and may be fully coated or fully coated except for inadvertent defects in the coating). The copper or copper alloy may be applied to the steel sheath by plating. Either the inner or the outer surface, or both, may be coated with the copper alloy. The opposing radial ends of the steel sheath may be joined via a seam that extends substantially along the length of the electrode. The seam may be a butt or overlap seam.

According to another aspect of the present disclosure, a method for producing a tubular welding electrode comprises the steps of (a) providing a strip of copper-coated steel material having a length and first and second surfaces, wherein at least the first surface of the strip is at least substantially coated with a copper alloy; (b) forming the strip into a "U" shape along the length; (c) filling the "U" shape of the strip with a granular flux; and (d) mechanically closing the "U" shape to form a sheath of copper-coated steel material that substantially encases the granular flux, thus forming a tubular welding electrode. The mechanical closing may involve forming a butt or overlap seam. The copper alloy may be plated onto the strip of steel material. The method may comprise a further step (e) of drawing the tubular welding electrode to a desired diameter. During step (b), the copper-coated surface may be located on either the inside or the outside, or both, of the "U" shape.

According to another aspect of the present disclosure, a method for producing a tubular welding electrode comprises the steps of (a) providing a strip of copper-coated steel material having a length and first and second surfaces, wherein the first surface of the strip is at least substantially coated with a copper alloy; (b) forming the strip into a substantially circular shape along the length; (c) welding the strip to form a tube sealed along the length; and (d) filling the sealed tube with a granular flux to form a tubular welding electrode. The copper alloy may be plated onto the strip of steel material. The method may comprise a further step (e) of drawing the tubular welding electrode to a desired diameter. During step (b), the copper-coated surface may be located on either the inside or the outside, or both, of the circular shape.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following is a description of the examples depicted in the accompanying drawings. The figures are not necessarily to scale, and certain features and certain views of the figures may be shown exaggerated in scale or in schematic in the interest of clarity or conciseness.

The foregoing summary, as well as the following detailed description, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify identical or similar elements.

Figure 1:
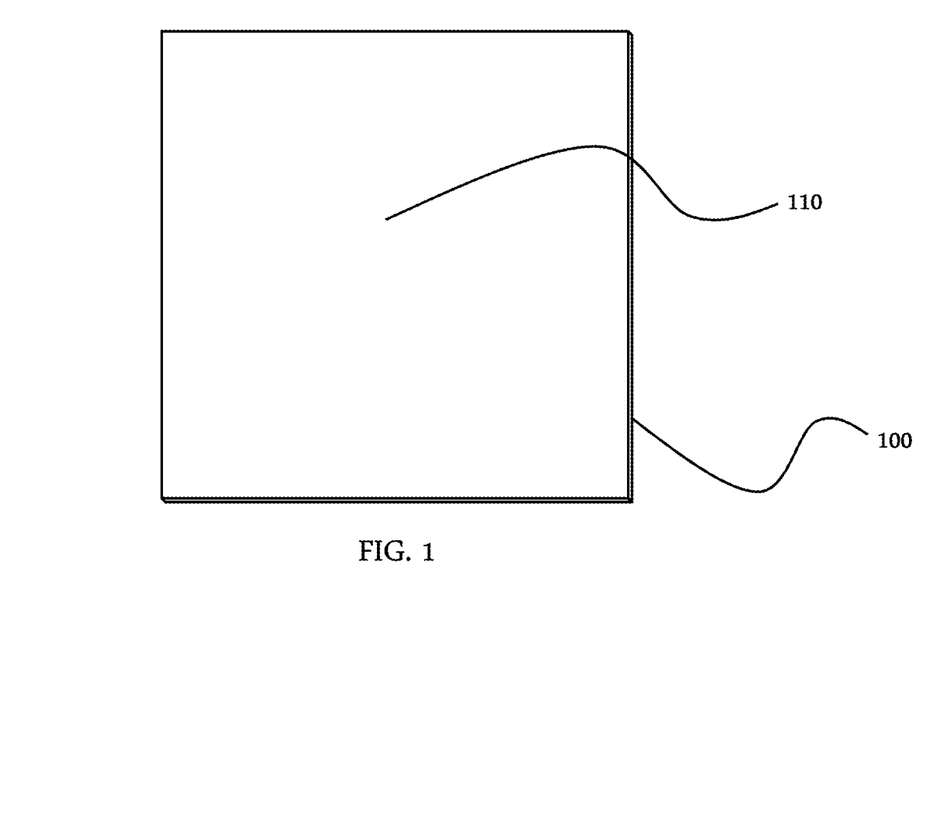
FIG. 1 is a drawing showing a strip of material.

The following example relates to copper coated tubular welding electrodes. Example tubular welding electrodes are manufactured by first providing a coated steel strip 100 having a length and opposing planar surfaces (one planar surface 110 is shown in FIG. 1. The material of the steel strip may be a carbon steel. Alternatively, where feasible, other metals may be used in lieu of a steel strip. The coating on the steel strip may be copper or a copper alloy. Instead of copper or a copper alloy, the coating may be formed from another metal, such as nickel or a nickel alloy, chromium or a chromium alloy, zinc or a zinc alloy, tin or a tin alloy, or aluminum or an aluminum alloy. For example, the coating may be an aluminum-silicon alloy (aluminum containing 5-11 wt. % silicon), which will result in aluminized steel when the alloy is coated onto the steel. These metals or alloys may be applied to the surface of the steel strip by plating. Plating may be electroplating or electroless plating (chemical plating). Alternatively, the coating metals or coating alloys may be applied to the surface of the steel strip by spraying. The coating is applied to either or both of the planar surfaces of the steel strip.

Multiple layers of metals or alloys may be built up upon the surface of a steel strip. For example, a steel strip may be coated with a layer of a nickel or nickel alloy. The nickel-based layer may then be coated with a layer of copper or copper alloy. The nickel-based layer may be easier to plate on to the steel strip than copper, and may improve the bonding of the layers. The nickel-based layer may improve the wear resistance and corrosion resistance of the coating.

Among the advantages of applying a copper or copper alloy coating to the steel strip is that, during welding of the tubular wire electrode, the copper-based coating provides improved electrical conductivity, reduced tip wear, better feeding, and/or fewer arcing issues.

Figure 2:
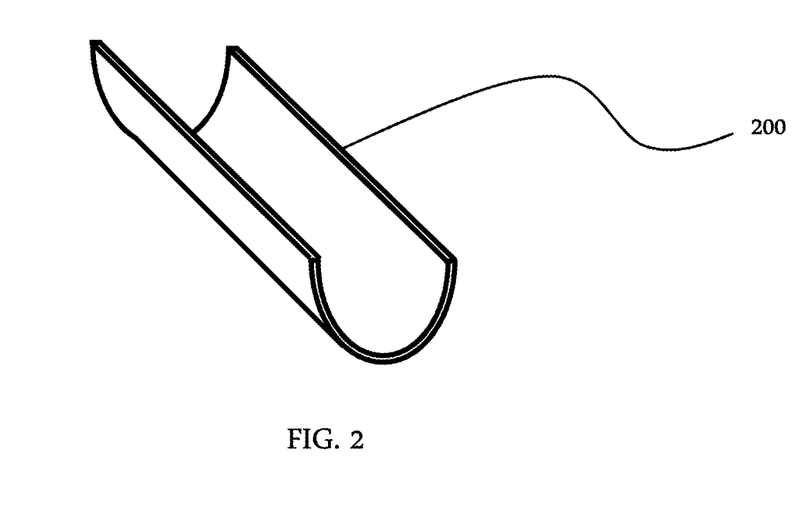
FIG. 2 is a drawing showing a strip of material that has been formed into a "U" shape.
Figure 3:
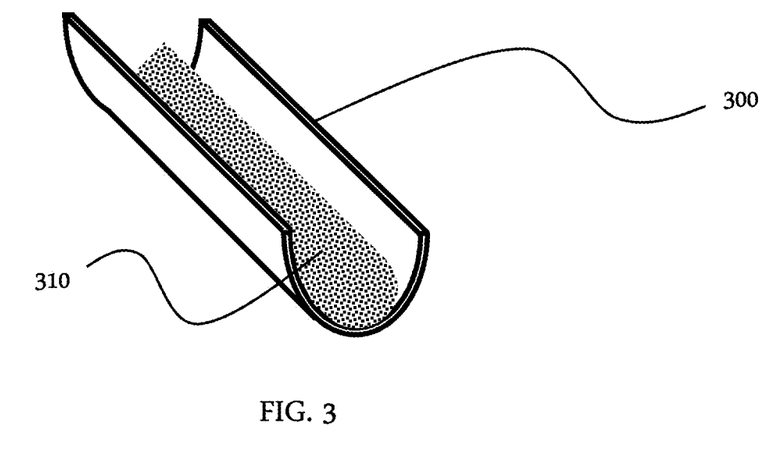
FIG. 3 is a drawing showing the "U" shaped strip filled with a granular flux.
Figure 4:
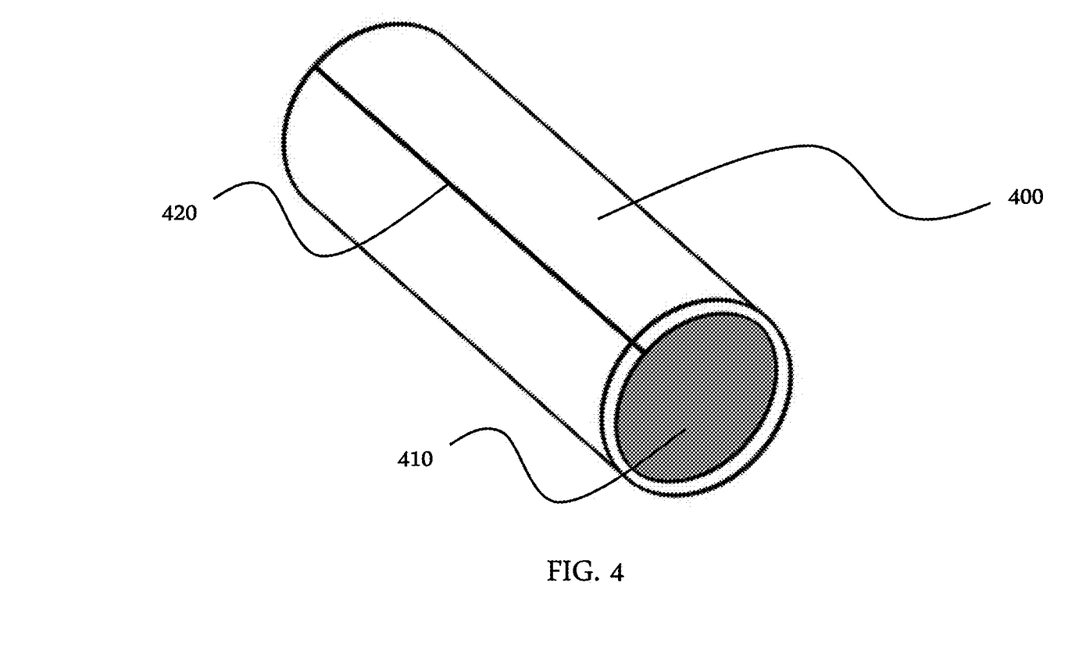
FIG. 4 is a drawing showing the strip formed into a sheath filled with a granular flux and closed with a butt seam.
Figure 5:
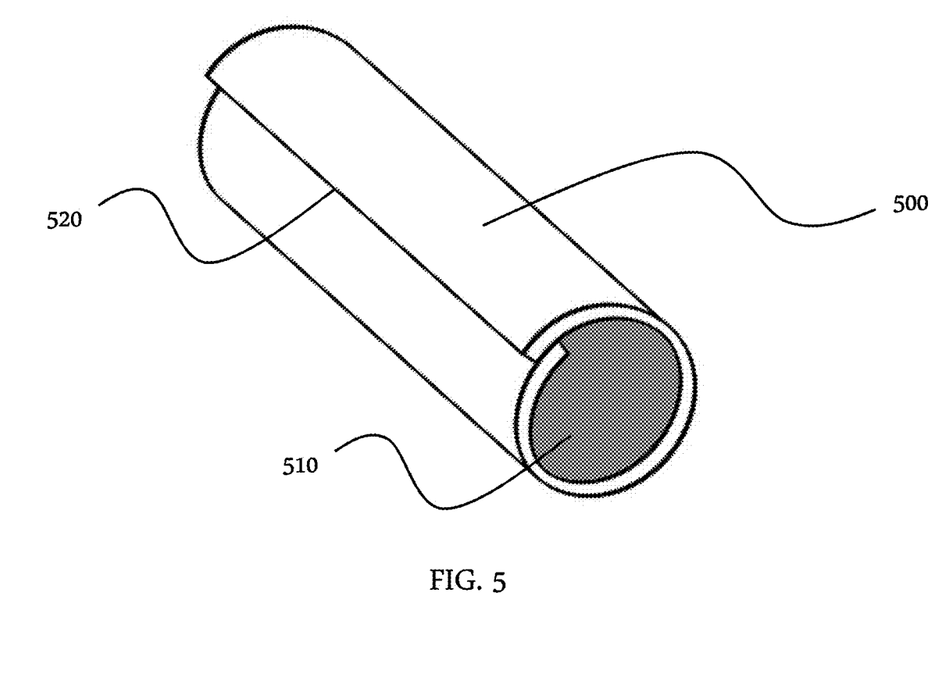
FIG. 5 is a drawing showing the strip formed into a sheath filled with a granular flux and closed with an overlap seam.

The example strip 200 is formed into a "U" shape along the length of the strip, as shown in FIG. 2. A "U" shape may also be referred to as a "C" shape or a semicircular shape. Once in a "U" shape, the strip 300 is filled with a granular flux 310, as shown in FIG. 3. The granular flux may be a granular powder flux or a granular metal flux. After filling, the "U" shape is mechanically closed—for example, via a butt seam 420 or overlap 520 seam—to form a sheath 400, 500 of copper-coated steel material that at least substantially (if not fully) encases the granular powder flux 410, 510, thus forming a tubular welding electrode, as shown in FIGS. 4 and 5. This production method provides an efficient and less expensive route than the conventional seamless process, while still reducing (e.g., preventing) the ability of acids and/or other undesired chemicals from reacting with the granular flux fill core. Seams may be formed by other methods—for example, by laser welding.

Figure 6:
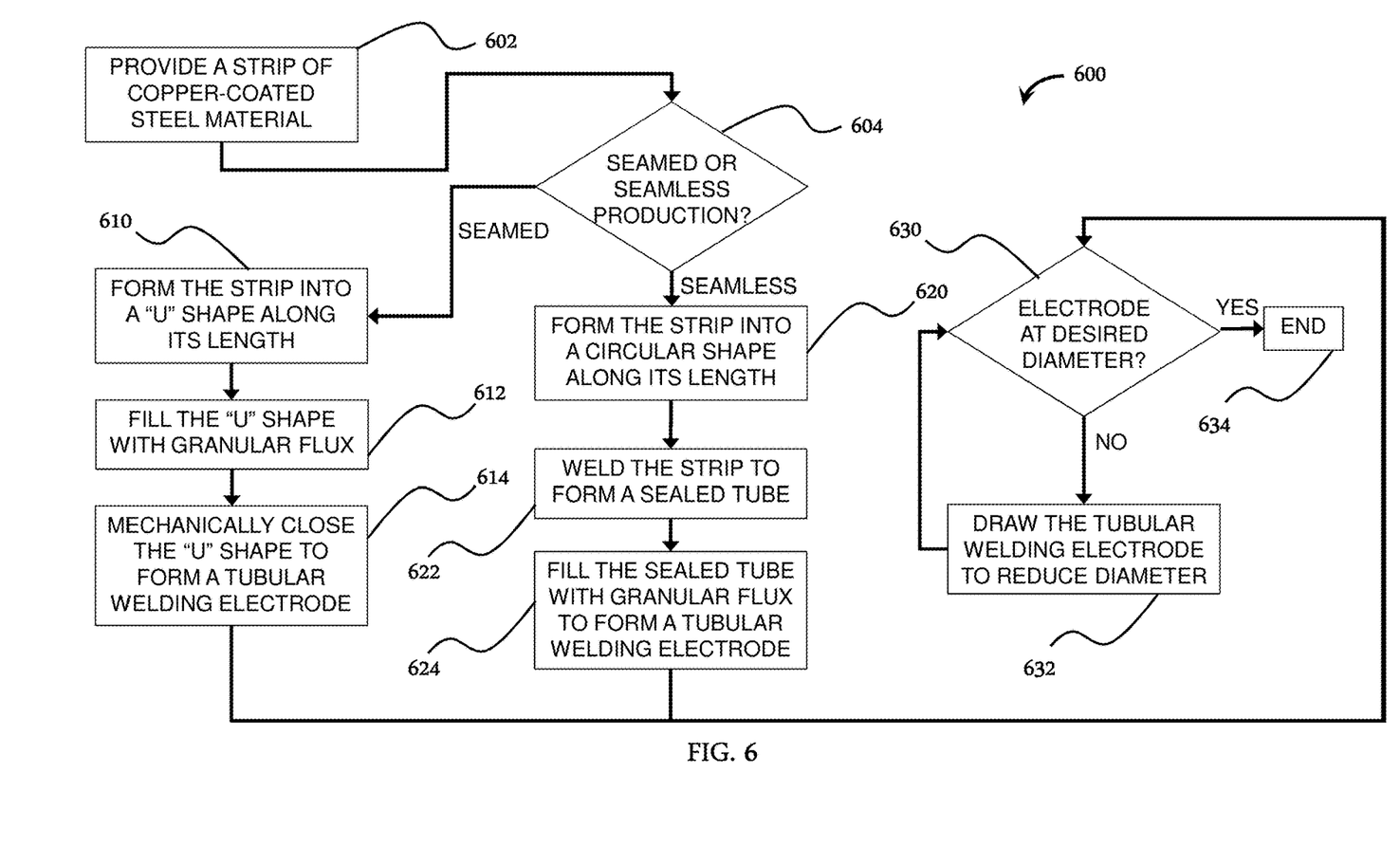
FIG. 6 is a flow chart showing manufacturing methods according to the present disclosure.

Example production methods 600 are shown in the flow chart in FIG. 6. A strip of copper-coated steel material is provided 602. Seamed or seamless production is selected 604. For seamed production, the coated strip is formed 610 into a "U" shape along the length of the strip. Once in a "U" shape, the strip is filled 612 with a granular flux. After filling, the "U" shape is mechanically closed 614 to form a sheath of copper-coated steel material that encases the granular powder flux, thus forming a tubular welding electrode. If desired 630, the tubular welding electrode may be drawn 632 to reduce the diameter to a desired diameter 634.

Alternatively, instead of forming the strip into a "U" shape, the strip may be formed into a substantially circular shape along its length 620. Once in a circular shape, the strip may be welded 622 along its length to form a sealed tube. The sealed tube can then be filled 624—for example, by a vibratory filling process—with a granular flux to form a tubular welding electrode. If desired 630, the tubular welding electrode may be drawn 632 to reduce the diameter to a desired diameter 634. For example, a sealed tube or tubular welding electrode with a ⅝ inch diameter may be drawn to a ⅜ inch diameter, or further to a 3/32 inch diameter, or further to a 0.045 inch diameter.

Some of the elements described herein are identified explicitly as being optional, while other elements are not identified in this way. Even if not identified as such, it will be noted that, in some examples, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A tubular welding electrode having a length comprising:
   a metal sheath extending at least substantially along the length of the electrode and at least substantially encasing a granular core that extends at least substantially along the length of the electrode;
   wherein the metal sheath has an inner and an outer surface;
   wherein the outer surface of the metal sheath is at least substantially coated with nickel or a nickel alloy to form a nickel-based layer and the nickel-based layer is at least substantially coated with copper or a copper alloy to form a copper-based layer upon the surface of the nickel-based layer;
   wherein the metal sheath has opposing radial ends that extend at least substantially along the length of the electrode; and
   wherein the opposing radial ends of the metal sheath are joined via a seam extending at least substantially along the length of the electrode.

2. The tubular welding electrode of claim 1, wherein the metal sheath is a steel sheath.

3. The tubular welding electrode of claim 1, wherein the nickel-based layer and the copper-based layer are formed upon the surface of the metal sheath prior to joining the opposing radial ends of the metal sheath.

4. The tubular welding electrode of claim 1, wherein the granular core is a granular powder flux fill core.

5. The tubular welding electrode of claim 1, wherein the granular core is a granular metal core.

6. The tubular welding electrode of claim 1, wherein the nickel-based layer is plated onto the outer surface of the metal sheath.

7. The tubular welding electrode of claim 6, wherein the copper-based layer is plated onto the nickel-based layer.

8. The tubular welding electrode of claim 1, wherein both the inner and outer surfaces of the metal sheath are at least substantially coated with a nickel-based layer and a copper-based layer.

9. A tubular welding electrode having a length comprising:
   a nickel sheath extending at least substantially along the length of the electrode and at least substantially encasing a granular core that extends at least substantially along the length of the electrode;
   wherein the nickel sheath has an inner and an outer surface;
   wherein the outer surface of the nickel sheath is at least substantially coated with copper or a copper alloy to form a copper-based layer upon the surface of the nickel sheath;
   wherein the nickel sheath has opposing radial ends that extend at least substantially along the length of the electrode; and
   wherein the opposing radial ends of the nickel sheath are joined via a seam extending at least substantially along the length of the electrode.

10. The tubular welding electrode of claim 9, wherein the copper-based layer is formed upon the surface of the nickel sheath prior to joining the opposing radial ends of the nickel sheath.

11. The tubular welding electrode of claim 9, wherein the granular core is a granular powder flux fill core.

12. The tubular welding electrode of claim 9, wherein the granular core is a granular metal core.

13. The tubular welding electrode of claim 9, wherein the copper-based layer is plated onto the nickel sheath.

14. The tubular welding electrode of claim 9, wherein both the inner and outer surfaces of the nickel sheath are at least substantially coated with a copper-based layer.

* * * * *